United States Patent
Froebus et al.

(10) Patent No.: US 9,061,833 B2
(45) Date of Patent: Jun. 23, 2015

(54) DRUM MOTOR WITH POLYGONAL TORQUE TRANSFER SECTION AND INNER SURFACE

(75) Inventors: Gerhard Froebus, Gedern (DE); Siegmund Dudek, Heinsberg (DE); Palani Velladurai, Mönchengladbach (DE)

(73) Assignee: INTERROLL HOLDING AG, Sant'Antonino (CH)

( * ) Notice: Subject to any disclaimer, the term of this patent is extended or adjusted under 35 U.S.C. 154(b) by 0 days.

(21) Appl. No.: 13/427,711

(22) Filed: Mar. 22, 2012

(65) Prior Publication Data

US 2013/0076201 A1 Mar. 28, 2013

Related U.S. Application Data

(63) Continuation of application No. PCT/EP2010/064064, filed on Sep. 23, 2010.

(30) Foreign Application Priority Data

Sep. 24, 2009 (DE) .............................. 20 2009 012 U

(51) Int. Cl.
*B65G 23/08* (2006.01)
*H02K 7/10* (2006.01)
(Continued)

(52) U.S. Cl.
CPC *B65G 23/08* (2013.01); *H02K 5/12* (2013.01); *H02K 7/1012* (2013.01); *H02K 7/14* (2013.01); *H02K 2207/03* (2013.01)

(58) Field of Classification Search
CPC ...... B65G 23/08; B65G 23/06; B65G 23/075; B65G 23/04; B65G 13/06; B65G 13/075; B65G 13/07; B65G 13/071; B65G 47/261; B65G 39/02; B65G 39/07; H02K 2207/03

USPC .......................................... 198/788, 789, 835
See application file for complete search history.

(56) References Cited

U.S. PATENT DOCUMENTS 3,064,797 A * 11/1962 Besel et al. .................... 198/813
3,252,594 A * 5/1966 Verrinder ................. 198/341.02
(Continued)

FOREIGN PATENT DOCUMENTS

DE      8124545 U1    12/1981
DE      9411204 U1     9/1994
(Continued)

OTHER PUBLICATIONS

Machine translation of DE 297 17 062 U1 submitted by Applicant.*
(Continued)

*Primary Examiner* — Quyen Leung
*Assistant Examiner* — Mark R Carter
(74) *Attorney, Agent, or Firm* — Kilpatrick Townsend & Stockton LLP; Kenneth R. Allen

(57) ABSTRACT

A drum motor for driving a conveyor belt has a drum motor shell that has at least one torque transfer section in which the outer surface of the shell is polygonal in cross-section. A sprocket having a polygonal, preferably hexagonal inner recess may be provided for transferring torque from the drum motor to a modular belt. Motor components are in a hollow space of the shell, namely a rotor and stator, a first bearing journal arranged on a first end of the shell and a second bearing journal arranged on a second end of the shell, the rotor and stator being mechanically coupled to the shell and to the first and second bearing journals in such a way that relative rotation between the rotor and stator causes relative rotation between the drum motor shell, for the one part, and the first and second bearing journals, for the other part.

9 Claims, 2 Drawing Sheets

(51) Int. Cl.
*H02K 5/12* (2006.01)
*H02K 7/14* (2006.01)

(56) References Cited

U.S. PATENT DOCUMENTS

| | | | |
|---|---|---|---|
| 3,354,735 A | 11/1967 | Holz | |
| 3,367,633 A | 2/1968 | Kratzer et al. | |
| 3,420,385 A * | 1/1969 | Verrinder | 414/792 |
| 3,612,236 A * | 10/1971 | Fernstrom et al. | 192/56.56 |
| 3,812,732 A | 5/1974 | Conrad | |
| 3,942,338 A * | 3/1976 | Furlette et al. | 464/34 |
| 4,056,953 A * | 11/1977 | Furlette et al. | 464/34 |
| 4,082,180 A * | 4/1978 | Chung | 198/835 |
| 4,143,525 A * | 3/1979 | Major | 198/781.02 |
| 4,266,659 A * | 5/1981 | Meyer et al. | 198/781.03 |
| 4,275,572 A * | 6/1981 | Holmes et al. | 464/34 |
| 4,327,563 A * | 5/1982 | Allmacher, Jr. | 464/37 |
| 4,505,381 A * | 3/1985 | Major | 198/781.02 |
| 4,601,389 A * | 7/1986 | Minovitch | 198/804 |
| 4,670,622 A * | 6/1987 | Livingston, Jr. | 136/246 |
| 4,811,797 A * | 3/1989 | Antipov et al. | 173/93.6 |
| 4,883,130 A * | 11/1989 | Dixon | 173/178 |
| 4,972,939 A * | 11/1990 | Uttke et al. | 198/501 |
| 5,011,004 A * | 4/1991 | D'Amato | 198/791 |
| 5,074,406 A | 12/1991 | Gundlach et al. | |
| 5,094,657 A | 3/1992 | Dworak et al. | |
| 5,156,263 A * | 10/1992 | Ledet | 198/834 |
| 5,170,883 A * | 12/1992 | Ledet et al. | 198/834 |
| 5,253,748 A * | 10/1993 | Ledet | 198/834 |
| 5,346,022 A * | 9/1994 | Krivec | 173/178 |
| RE35,617 E * | 9/1997 | Krivec | 173/178 |
| 5,934,447 A | 8/1999 | Kanaris | |
| 6,033,106 A * | 3/2000 | Lesimple et al. | 366/198 |
| 7,721,875 B2 * | 5/2010 | Stegmiller | 198/782 |
| 8,006,829 B2 * | 8/2011 | Itoh et al. | 198/788 |
| 8,028,618 B2 * | 10/2011 | Lapeyre | 99/443 R |
| 2003/0173190 A1 | 9/2003 | Kanaris | |
| 2005/0217967 A1 * | 10/2005 | Scott | 193/37 |
| 2009/0166157 A1 * | 7/2009 | Kratz et al. | 198/788 |
| 2010/0072031 A1 * | 3/2010 | Schwesig | 198/789 |
| 2010/0212514 A1 * | 8/2010 | Lapeyre | 99/443 |
| 2012/0097194 A1 | 4/2012 | McDaniel et al. | |

FOREIGN PATENT DOCUMENTS

| | | |
|---|---|---|
| DE | 69025459 T2 | 7/1996 |
| DE | 29717062 U1 | 12/1998 |
| DE | 69605232 T2 | 7/2000 |
| DE | 10337529 A1 | 1/2005 |
| DE | 60216301 T2 | 3/2007 |
| DE | 102006060009 A1 | 6/2008 |
| DE | 202009012822 U1 | 2/2011 |
| DK | 400787 | 1/1989 |
| DK | 400787 A | 2/1989 |
| GB | 2 005 625 A | 4/1979 |
| JP | S32-006168 | 8/1957 |
| JP | H05246525 A | 9/1993 |
| JP | 2003300610 A2 | 10/2003 |
| TW | M348 768 | 1/2009 |
| WO | 2011/036216 A3 | 3/2011 |

OTHER PUBLICATIONS

Written Opinion of the International Searching Authority for PCT Application No. PCT/EP2010/064064, mailed on Aug. 22, 2012, 13 pages.
International Preliminary Report on Patentability, mailed on Dec. 14, 2012 for PCT Application No. PCT/EP2010/064064, 12 pages.
The International Search Report and Written Opinion of the International Searching Authority for PCT Application No. PCT/EP2010/064064, mailed on Jan. 4, 2012, 24 pages.
Non-Final Office Action of Apr. 24, 2014 for U.S. Appl. No. 13/456,855, 8 pages.
Office Action for Chinese Patent Application No. 201080042855.0, mailed May 6, 2014, 9 pages.
Office Action for Korean Patent Application No. 10-2012-7010288, mailed Jun. 2, 2014, 3 pages.
Office Action for Chinese Patent Application No. 201080053076.0, mailed Jan. 7, 2014, 3 pages.
Office Action for Japanese Patent Application No. 2012-539359 mailed Jan. 10, 2014, 2 pages.

* cited by examiner

DRUM MOTOR WITH POLYGONAL TORQUE TRANSFER SECTION AND INNER SURFACE

CROSS REFERENCE TO RELATED APPLICATIONS

This application is a continuation of PCT/EP2010/064064 filed 23 Sep. 2010, the content of which is incorporated by reference herein in its entirety for all purposes, and which in turn claims priority under International Law to German Patent Application 20 2009 012 822.9 filed 24 Sep. 2009.

BACKGROUND OF THE INVENTION

The invention relates to a drum motor for driving a conveyor belt, in particular a modular belt in hygienic surroundings involving exposure to splash water and pressurized water, said drum motor comprising a drum motor shell having a hollow space therein, motor components arranged in said hollow space, namely a rotor and a stator, a first bearing journal arranged on a first end of the drum motor shell and a second bearing journal arranged on a second end of the drum motor shell, the rotor and the stator being mechanically coupled to the drum motor shell and the first and second bearing journals in such a way that relative rotation between the rotor and the stator causes relative rotation between the drum motor shell, for the one part, and the first and second bearing journals, for the other part.

The invention also relates to a sprocket for transferring a torque from a drum motor to a modular belt.

Drum motors are known from the applicant's DE 10 2006 054 575 A1 application and EP 1 02 1664 B1 patent, for example. Drum motors of the kind initially specified are used in conveyor systems to drive conveyor belts. They have a cylindrical outer shape that is generally formed by the rod-like drum motor shell. In many cases, the drum motor shell is designed as a cylindrical hollow profile. The rotor and stator which drive the laterally arranged bearing journals rotatingly in relation to the drum motor shell are arranged as motor components in the hollow space of the drum motor shell. The drum motor is held in place at the bearing journals, while the drum motor shell drives a conveyor belt, in particular a modular belt.

Typical fields of application for conveyor systems driven by drum motors include mail distribution centres, the food processing industry, assembly lines in the electronics industry, interlinked machines in automation, production facilities, dispatch and packaging lines, warehouse picking systems, wholesale pharmaceutical distribution, pallet transport in beverage sales, cargo handling and cash desks in supermarkets, for example. In the food processing industry, in particular, where dairy produce, fish or meat, for example, is transported, drum motors must comply with the high standards of hygiene in that industry and withstand washing with chemicals and hot pressurized water. Drive systems comprising geared motors such as drum motors are a potential source of contamination in food processing. Drum motor for use in food processing must therefore be designed and treated in such a way that the risk of contamination is reduced. For that reason, such drum motors are mostly made of smooth, profiled stainless steel and are hermetically encapsulated and sealed. Modular belts made of plastic are commonly used in the food industry. To transfer the torque of the drum motor to the conveyor belt, in particular to the modular belts, profiled rubber lagging arranged on the drum motor shell can be used. The rubber profile is matched to the type of belt to be driven. Due to the profiled rubber lagging, the friction between the drum motor shell and the conveyor belt is increased and slip between the drum motor shell and the conveyor belt is prevented. However, the torque can also be transferred via sprockets, preferably of stainless steel, which have a cylindrical inner recess and are arranged on the drum motor shell. To that end, the torque is transferred from the drum motor shell to the sprockets via a feather key arranged in a groove of the drum motor shell.

These solutions already provide good torque transfer and are suitable for use in the food industry, but there is also a need for drum motors with further improved and/or simplified torque transfer and which further reduce the risk of contamination when used in the food processing industry.

As products that are manufactured in larger series, drum motors must also meet high standards in respect of both cost-efficiency and quality. The aim is therefore to reduce the production costs of drum motors without any deterioration with regard to operating characteristics, service life or maintenance intervals.

The object of the present invention is therefore to meet one or more of the aforementioned needs at least partially.

SUMMARY

According to the invention, this object is achieved by the drum motor shell having at least one torque transfer section in which the outer surface of the drum motor shell is polygonal in cross-section. The at least one torque transfer section of the drum motor shell is used to transfer the torque from the drum motor shell to a conveyor belt. A sprocket arranged on the torque transfer section of the drum motor shell is preferably used for this purpose. The width of the at least one torque transfer section along the axis of the drum motor shell is preferably at least equal to the width of the sprockets arranged thereon. At their outer periphery, the sprockets have teeth which are matched to the conveyor belts or modular belts to be driven. Thus, by using different sprockets, it is possible to drive different types of belt.

The advantage of this polygonal design over cylindrical designs is the torque can be transferred via the polygonal cross-section of the outer face of the drum motor shell to a sprocket arranged on the drum motor shell. In this way, it is possible to dispense with the transmission means required in the prior art, such as profiled rubber lagging and feather keys. It is possible as a result to save the costs for such transmission means. The hygienic properties of the drum motor are also improved, in that the number of parts involved and hence the number of interfaces and spaces between the parts is reduced as a result of dispensing with such transmission means, and because there is no longer any possibility of contamination being deposited or residues being formed, for example between the profiled rubber lagging and the drum motor shell, in the feather key slot or in the recess in the sprocket for receiving the feather key.

The sprocket preferably has an inner recess adapted to the cross-sectional shape of the outer surface of the drum motor shell, so that as much as possible of the entire outer surface of the drum motor shell in the region of the torque transfer section can be used for torque transfer. It is further preferred that the drum motor have a plurality of spaced-apart torque transfer sections on its drum motor shell, with a sprocket being arranged on each of the segments. By this means, the torque can be transferred uniformly over the length of the drum motor in the axial direction of the drum motor shell. The torque transfer section may also extend over a greater proportion of the axial length of the drum motor shell, so that it is also possible for two or more sprockets to be arranged in spaced-apart manner on the same torque transfer section.

The drum motor is preferably provided with a first bearing cap which closes the hollow space of the shell at the first end of the shell. It is also preferable that the drum motor have a second bearing cap which closes the hollow space of the shell at the second end of the shell. It is preferred in this regard that the first and/or the second bearing cap each has/have an opening to receive the respective first or second bearing journal. The bearing caps preferably have an outer surface which is polygonal in cross-section and which matches the cross-sectional shape of the torque transfer section. It is also preferred that the bearing caps have an inner cylindrical through bore. The hollow space of the drum motor shell can be closed by means of the bearing caps, so a sufficiently tight seal for use in the food sector can be ensured. It is further preferred that the drum motor shell and/or the two bearing caps are made of stainless steel. Stainless steel is particularly preferred for applications in the food sector. One or both of the bearing caps is/are preferably welded to the drum motor shell or joined to the drum motor shell with a press-fit connection. These kinds of connection ensure that the hollow space of the drum motor shell is sealed in a particularly reliable manner, which is advantageous in the food processing industry, in particular.

The invention can be developed by giving the inner surface of the drum motor shell in the torque transfer section a polygonal cross-section. The invention can be still further developed by making the inner surface of the drum motor shell in the torque transfer section parallel to the outer surface of the drum motor shell. These developments entail both the inner and outer surfaces of the drum motor shell being polygonal and preferably matching each other. This advantageously allows the drum motor shell to be produced in an efficient manner.

The invention can be formed by making the outer surface of the drum motor shell in the torque transfer section and/or the inner surface of the drum motor shell in the torque transfer section hexagonal in cross-section. Compared to a square design, for example, a hexagonal design has the advantage of being more compact. For the same maximum cylindrical inner diameter enclosed by a square and a hexagon, the hexagon design has an effective outer cylindrical diameter that is approximately 20% smaller and a mass moment of inertia that is about 15% less than the square design. A smaller effective outer diameter of the torque transfer section of the drum motor shell results in better torque transfer.

The invention can be developed by extending the torque transfer section over the entire length of the drum motor shell. This development stipulates that the drum motor shell has a uniform cross-section over its entire axial length and that the entire drum motor shell is embodied as a torque transfer section. This has the advantage that production is simplified, in that there is only one cross-sectional shape over the entire axial length, and the advantage that no skewing and no flaws can occur in the outer surface along the axis of the drum motor shell, in which contaminated material could be deposited.

In this development, also, two or more sprockets may be arranged on the drum motor shell, which is designed in its entirety as one torque transfer section.

The invention can be developed by designing the drum motor shell as a hollow profile of polygonal cross-section. It is particularly preferred that the drum motor shell be designed as a hollow profile of hexagonal cross-section. Using a hollow profile as a drum motor shell makes it possible for production to be particularly efficient and inexpensive. A hexagonal design extending over the entire length of the drum motor shell fortifies the aforementioned advantages of the cross-section being hexagonal in certain segments.

One preferred development of the drum motor according to the invention is characterized by one, two or a plurality of sprockets replaceably arranged on the drum motor shell and each having an inner recess matching the shape of the cross-section of the outer surface of the torque transfer section. The combination of a drum motor shell according to the invention with—preferably depending on the axial length of the drum motor shell—one, two or a plurality of sprockets arranged on the torque transfer section of the drum motor shell and having an inner recess adapted to the cross-section of the torque transfer section allows the advantages associated with the invention to be optimally exploited. The sprockets are preferably mounted replaceably on the torque transfer section of the drum motor shell, such that they can be replaced with other sprockets, in particular sprockets with peripheral teeth adapted to a different type of belt.

Another aspect of the invention is a sprocket for transferring a torque from a drum motor, as described in the foregoing, to a conveyor belt, in particular a modular belt, characterized in that the sprocket has a polygonal, preferably hexagonal, inner recess. With this embodiment of the inner sprocket recess, adapted to the cross-section of the outer surface of the torque transfer section of the drum motor shell, it is possible to ensure particularly efficient torque transfer to the sprocket from the outer surface of the drum motor shell in the torque transfer section.

The sprocket according to the invention can be developed in such a way that the sprocket is designed to be mounted replaceably on the torque transfer section of the drum motor shell of a drum motor of the kind previously described.

With regard to the advantages, variant of the invention and details this further aspect of the invention and its developments, reference is made to the respective, previously described, aspects of those product forms and developments that are relevant for this further aspect of the invention.

BRIEF DESCRIPTION OF THE DRAWINGS

A preferred embodiment of the invention shall now be described with reference to the Figures, in which.

DETAILED DESCRIPTION OF THE INVENTION

Figure 1:
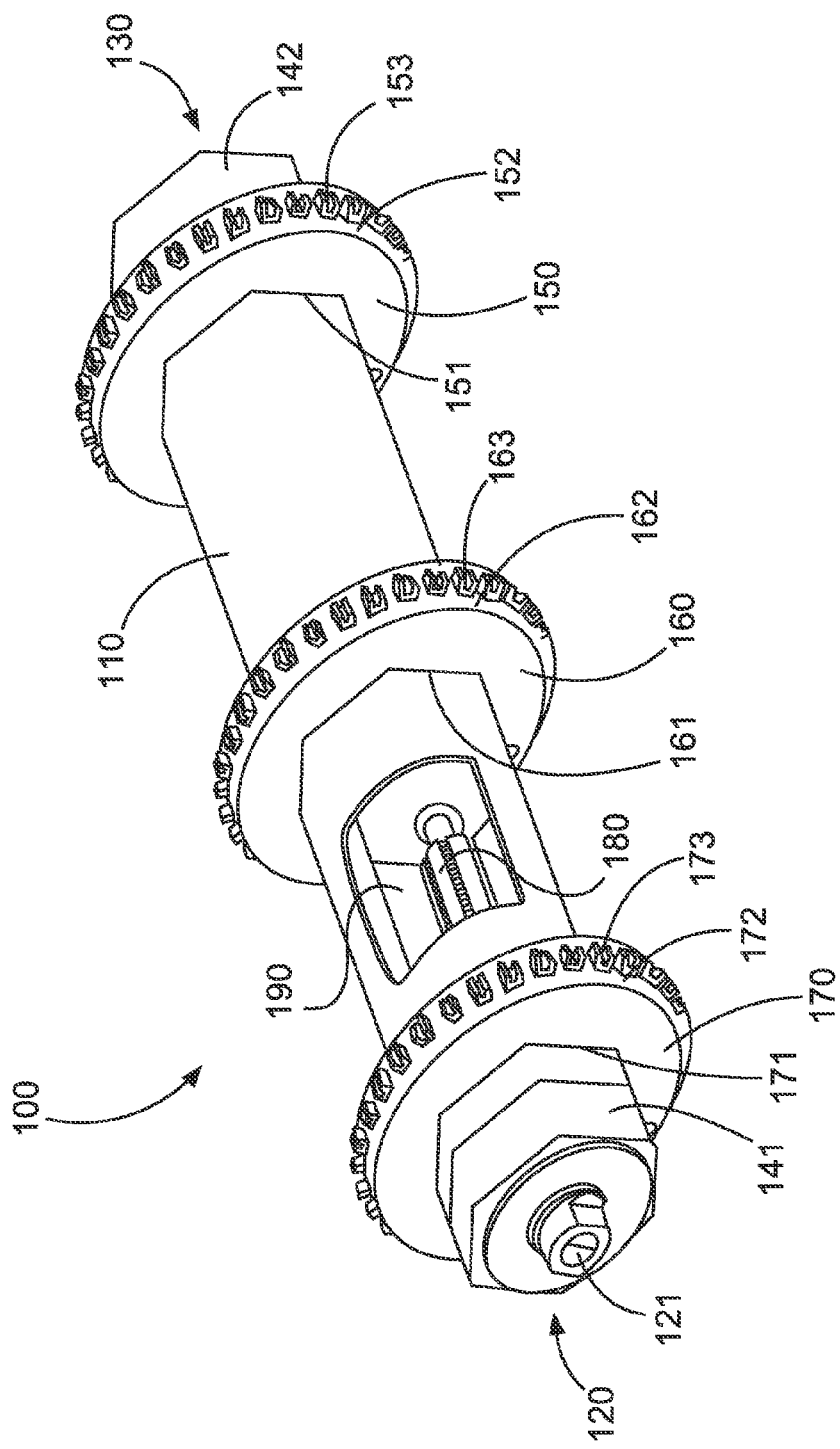
FIG. 1: shows a three-dimensional view of a drum motor according to the invention, which is provided with three sprockets.

FIG. 1 shows a drum motor 100 with components including rotor 180 and stator 190 according to the invention, comprising a drum motor shell 110 and three sprockets 150, 160, 170 according to the invention. Drum motor 100 has a torque transfer section in the form of a hexagonal hollow profile. In the drum motor 100 according to the invention as shown in FIG. 1, the torque transfer section extends over the over the entire length of the drum motor shell 110 in the axial direction. The torque transfer section is therefore identical to drum motor shell 110 in the inventive drum motor 100 shown in FIG. 1.

Drum motor shell 110 is sealed at its first end 120 by a bearing cap 141. A first bearing journal 121 protrudes through bearing cap 141. At the second end 130 of drum motor shell 110, there is another bearing cap 142, through which a second bearing journal (not shown) protrudes. The bearing caps are of hexagonal peripheral cross-section and have an inner cylindrical bore. The bearing journals are used to mount drum motor 100.

Three sprockets 150, 160, 170 are arranged equidistant from each other on the outer periphery of drum motor shell 110. Sprockets 150, 160, 170 each have a hexagonal inner recess 151, 161, 171. On the outer peripheries 152, 162, 172 of sprockets 150, 160, 170, teeth 153, 163, 173 are arranged that match a belt or type of belt to be driven.

Drum motor shell 110 is driven rotatably relative to the bearing journals by motor components (not shown) which are arranged in the hollow space of drum motor shell 110. The torque of drum motor shell 110 is transferred to the sprockets via the hexagonal cross-section of the outer surface of drum motor shell 110 and also via the inner recesses 151, 161, 171 in sprockets 150, 160, 170. Due to this hexagonal embodiment, it is possible to dispense with feather keys and profiled rubber lagging as means of torque transfer, thus resulting in savings in production and reduced susceptibility of drum motor 100 to contamination.

Figure 2:
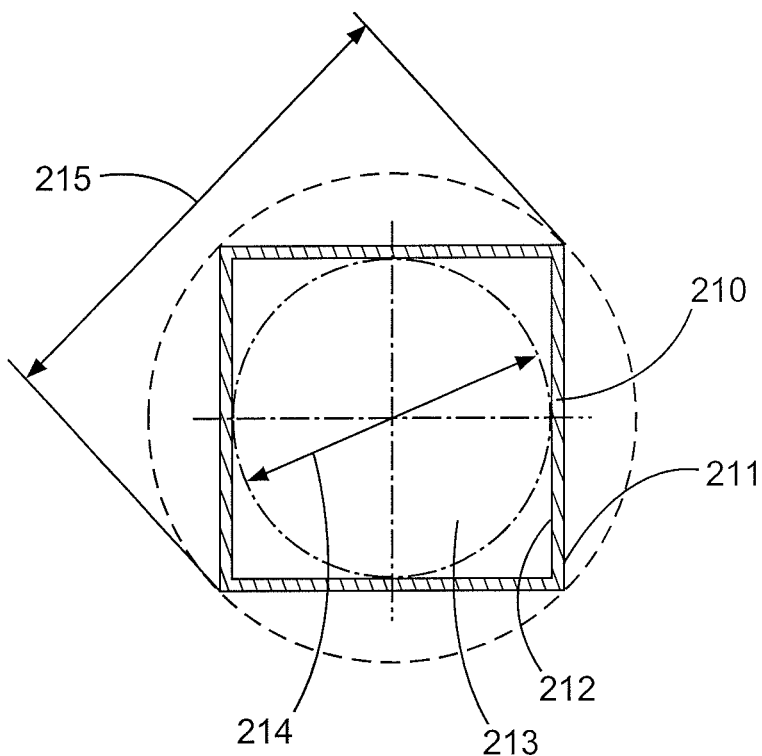
FIG. 2: shows a torque transfer section of a drum motor shell of a drum motor according to the invention, said segment having a square cross-section.

FIG. 2 shows a drum motor shell 210 of a drum motor according to the invention, said drum motor shell 210 having a square cross-section and a hollow space 213 therein. Drum motor shell 210 has an outer surface 211 and an inner surface 212. Both the inner surface 212 and the outer surface 211 are square in cross-section and parallel to each other. Drum motor shell 210 may be embodied as a hollow profile of square cross-section. For a maximum cylindrical inner diameter 214, the torque transfer section of square cross-section has an effective cylindrical outer diameter 215.

Figure 3:
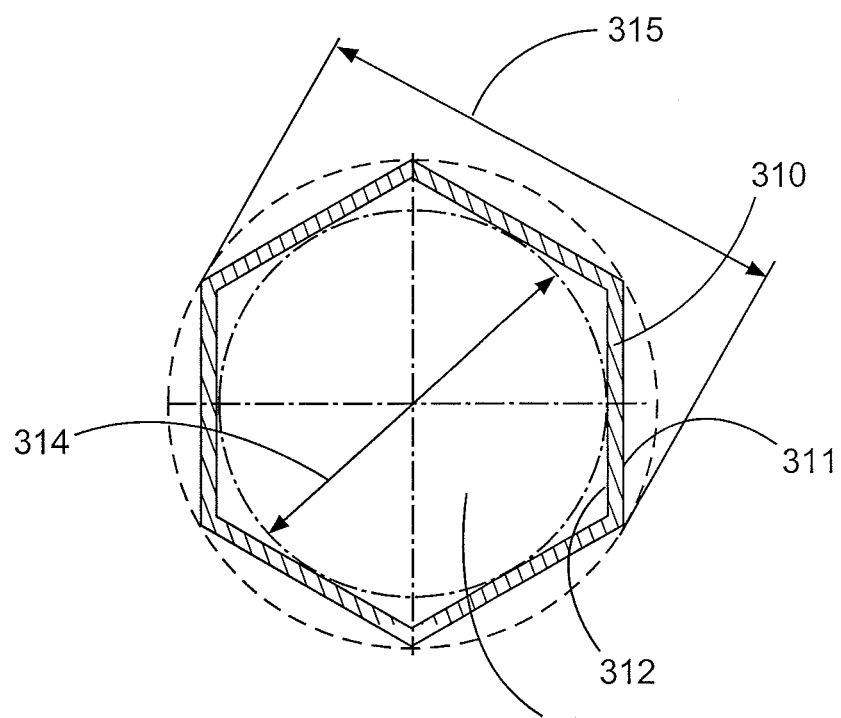
FIG. 3: shows a torque transfer section of a drum motor shell of a drum motor according to the invention, said segment having a hexagonal cross-section.

FIG. 3 shows a drum motor shell 310 of a drum motor according to the invention, said drum motor shell 310 having a hexagonal cross-section and a hollow space 313 therein. Drum motor shell 310 has an outer surface 311 and an inner surface 312. Both the inner surface 312 and the outer surface 311 are hexagonal in cross-section and parallel to each other. Drum motor shell 310 may be embodied as a hollow profile of hexagonal cross-section. For a maximum cylindrical inner diameter 314, the torque transfer section of hexagonal cross-section has an effective cylindrical outer diameter 315. Compared to the square embodiment shown in FIG. 2, this hexagonal embodiment has the advantage of being a more compact design. For the same maximum cylindrical inner diameter, the hexagonal cross-section in FIG. 3 has an effective outer cylindrical diameter that is approximately 20% smaller and a mass moment of inertia that is about 15% less than the square cross-section in FIG. 2. The smaller effective outer diameter of the hexagonal torque transfer section of the drum motor shell results in better torque transfer than a square cross-section and allows the drum motor to be similarly compact in design to one of cylindrical cross-section.

What is claimed is:

1. A drum motor for driving a conveyor belt in hygienic surroundings involving exposure to splash water and pressurized water, comprising:
    a drum motor shell having a sealed hollow space therein,
    motor components arranged in said hollow space having a rotor and a stator,
    a first bearing journal arranged at a first end of the drum motor shell, and
    a second bearing journal arranged at a second end of the drum motor shell,
    the rotor and the stator being mechanically coupled to the drum motor shell and to the first and second bearing journals in such a way that relative rotation between the rotor and stator causes relative rotation between the drum motor shell, for the one part, and the first and second bearing journals, for the other part,
    the drum motor shell having at least one torque transfer section in which the outer surface of the drum motor shell is polygonal in cross-section, and wherein
    the inner surface of the drum motor shell in the torque transfer section is polygonal in cross-section.

2. The drum motor according to claim 1,
    characterized in that the inner surface of the drum motor shell in the torque transfer section is parallel to the outer surface of the drum motor shell.

3. The drum motor according to claim 1,
    characterized in that at least one of the outer surface of the drum motor shell in the torque transfer section and the inner surface of the drum motor shell in the torque transfer section is hexagonal in cross-section.

4. The drum motor according claim 3,
    characterized in that the torque transfer section extends over the entire length of the drum motor shell.

5. The drum motor according to claim 4,
    characterized in that the drum motor shell is designed as a hollow profile of hexagonal cross-section.

6. The drum motor according to claim 5,
    characterized one, two or a plurality of sprockets replaceably arranged on the drum motor shell and each having an inner recess matching the shape of the cross-section of the outer surface of the torque transfer section.

7. The drum motor according claim 1,
    characterized in that the torque transfer section extends over the entire length of the drum motor shell.

8. The drum motor according to claim 1,
    characterized by one, two or a plurality of sprockets replaceably arranged on the drum motor shell and each having an inner recess matching the shape of the cross-section of the outer surface of the torque transfer section.

9. The drum motor according to claim 1 further including a sprocket arranged in the at least one torque transfer section of the drum motor shell so that the at least one torque transfer section of the drum motor shell is used to transfer torque from the drum motor shell to the conveyor belt.

* * * * *